(12) United States Patent
Halasy-Wimmer et al.

(10) Patent No.: US 6,923,295 B2
(45) Date of Patent: Aug. 2, 2005

(54) FRICTION BRAKE

(75) Inventors: Georg Halasy-Wimmer, Markgröningen (DE); Stefan Johannes Schmitt, Eltville (DE); Andreas Pohlmann, Eschborn (DE); Johannes Görlach, Langgöns (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 24 days.

(21) Appl. No.: 10/444,276

(22) Filed: May 23, 2003

(65) Prior Publication Data

US 2003/0217897 A1 Nov. 27, 2003

(30) Foreign Application Priority Data

May 25, 2002  (DE) .......................................... 102 23 389

(51) Int. Cl.[7] .............................................. F16D 55/02
(52) U.S. Cl. ...................... 188/71.2; 188/156; 188/72.1
(58) Field of Search .............................. 188/71.2, 72.2, 188/72.7, 138, 156, 72.1, 158, 137, 161, 163

(56) References Cited

U.S. PATENT DOCUMENTS

| | | | |
|---|---|---|---|
| 3,977,631 A | * | 8/1976 | Jenny ........................ 188/71.5 |
| 4,432,440 A | | 2/1984 | Crossman |
| 5,322,146 A | | 6/1994 | Holl et al. |
| 5,388,669 A | | 2/1995 | Holl et al. |
| 6,318,513 B1 | | 11/2001 | Dietrich et al. |
| 6,508,336 B1 | * | 1/2003 | El-Kassouf ................ 188/71.5 |

FOREIGN PATENT DOCUMENTS

| | | |
|---|---|---|
| DE | 42 07 640 C2 | 9/1993 |
| DE | 42 07 641 C2 | 9/1993 |
| DE | 195 44 248 C1 | 5/1997 |
| DE | 198 19 564 A1 | 12/1999 |
| DE | 199 60 327 A1 | 6/2001 |
| DE | 101 04 739 C1 | 11/2002 |

\* cited by examiner

*Primary Examiner*—Robert A. Siconolfi
*Assistant Examiner*—Melanie Torres
(74) *Attorney, Agent, or Firm*—RatnerPrestia

(57) ABSTRACT

The present invention relates to a friction brake, in particular a disc brake, for a motor vehicle with a friction element, e.g. a brake disc, coupled to the rotation of a vehicle wheel, forming a friction pairing of the friction brake with at least one associated brake lining, and with at least one clamping device for pressing at least one brake lining to the friction element. At least one controllable friction clutch is provided for using the rotational energy of the friction element in order to obtain the clamping force of the friction brake, the friction clutch being coupled on its input end to the rotation of the friction element and on its output end to the clamping device. Functional advantages are achieved because a friction pairing of the friction clutch is provided independently of the friction pairing of the friction brake. This eliminates undesired mutual influences. Altogether, such a friction brake obviates the need for an additional energy source for generating a brake clamping force.

19 Claims, 4 Drawing Sheets

FRICTION BRAKE

BACKGROUND OF THE INVENTION

The present invention relates to a friction brake, in particular a disc brake, for a motor vehicle with a friction element, e.g. a brake disc, coupled to the rotation of a vehicle wheel and brake linings assigned to it which can be pressed against the friction element by a disc brake clamping device.

Due to high demands of said friction brakes with regard to the brake clamping force as well as the tension force dynamics, especially within modern controllable brake systems, usually high-performance brake clamping devices and related energy sources are necessary. Yet, the high-performance brake clamping devices and energy sources are not only expensive, but present also disadvantages with regard to their weight and their dimensions. Above all, this has a negative effect on such friction brakes that are provided with brake clamping devices being operated electrically, electromechanically or by an electric motor.

In DE 42 07 640 C2 a motor vehicle disc brake is disclosed in which a mechanical brake clamping device for pressing brake linings onto a respective brake disc acts upon at least one brake lining. In this case the brake disc is connected in an unrotatable manner with a vehicle wheel. The energy source for operating the clamping device is the rotating vehicle wheel itself respectively the brake disc coupled to the clamping device by means of a friction clutch. In order to actuate the brake, the friction clutch can be brought electromagnetically into frictional engagement with the brake disc thus taking up the rotational energy from the brake disc and introducing it into the clamping device. Therefore, toothed wheels between the friction clutch and the clamping device are provided causing a torque transmission respectively introduction into the clamping device of the friction brake. A conversion of the rotational movement into a translation movement to be transmitted to the brake lining is achieved within the clamping device by means of a ball and ramp arrangement. The ball and ramp arrangement, however, presents the disadvantage of having a limited clamping path, which may be insufficient in case of very worn-out brake linings. Using the rotational energy of the brake disc for clamping the brake during its actuation eliminates the need for an expensive high-performance driving source. The disadvantage of such an arrangement certainly is that very large components with a relatively high moment of inertia have to be put into rotation within the friction brake. Due to the direct frictional engagement with the brake disc, the friction clutch is also subject to the thermal influences of the brake disc that affect its function and may have a negative effect on the friction value within the friction clutch. Furthermore friction clutch and toothed wheels for the clamping device are exposed without protection to environmental influences, as e.g. dirt and humidity.

On this basis, it is the object of the present invention to indicate a generic friction brake that allows clamping the friction brake without an expensive clamping device with energy source under any operating condition and overcomes the above-mentioned disadvantages of the state of the art.

BRIEF SUMMARY OF THE INVENTION

For a friction brake, in particular disc brake for a motor vehicle, with at least one friction element coupled to the rotation of a vehicle wheel forming a friction pairing of the friction brake with at least one associated brake lining, with at least one clamping device for pressing at least one brake lining against the friction element, with at least one controllable friction clutch being coupled with the input end to the rotation of the friction element and with the output end to the clamping device, this object of the present invention is achieved in that a friction pairing of the friction clutch is provided independently of the friction pairing of the friction brake.

According to these features the friction brake, in particular the disc brake, for a motor vehicle includes at least one friction element coupled to the rotation of a vehicle wheel which forms a friction pairing of the friction brake with at least one brake lining assigned to it, at least one clamping device for pressing the brake lining against the friction element and one controllable friction clutch being coupled with its input-end portion to the rotation of the friction element and with its output-end portion to the clamping device. The input-end and output-end portions of the friction clutch are not meshed when in state of rest and can interact in a controllable manner when the brake is actuated in order to tribologically transfer a moment thus forming the friction pairing of the friction clutch. In this case the rotational energy of the friction element respectively the vehicle wheel is used for driving the clamping device. The friction element is provided in particular as a brake disc being connected with the vehicle wheel in an unrotatable manner. Alternatively, the friction element may also be a brake drum. According to the present invention, the friction pairing of the friction clutch is independent of a friction pairing of the friction brake, so that undesired thermal influences of the friction brake do not have any effect on the friction pairing of the friction clutch. But the friction pairing of the friction clutch does not interact directly with the friction element, whereby the friction clutch is decoupled from the negative thermal influences of the friction element. In particular there is the possibility to arrange the friction clutch spatially separated from the friction element and to protect and/or enclose it. Thus, undesired environmental effects on the friction clutch, which could endanger the function of the friction clutch, can be excluded. Therefore the friction clutch forms a separate tribological system with regard to the friction brake. Hence, the friction value can be provided independently within the controllable friction clutch by means of constructive measures in order to obtain a constant friction value within the friction clutch independently from the operative conditions of the friction brake.

One advantageous embodiment of the friction brake provides a thermal decoupling of the friction pairing of the friction clutch from the friction pairing of the friction brake. For this reason the friction pairing of the friction clutch is thermally isolated with regard to the friction pairing of the friction brake, e.g. by means of an isolation layer in between. The effect of the controllable friction clutch thus remains essentially free from undesired thermal influences, which could have a negative effect on the friction value within the friction clutch. Furthermore, there is the possibility to thermally decouple the friction pairing of the friction clutch from the friction pairing of the friction brake by separating them spatially. This can be done, e.g. by providing the friction pairing on different, separate components.

An alternative embodiment of the independent configuration of friction brake and friction clutch consists in that the friction pairing of the friction clutch has a different combination of friction materials than the friction pairing of the friction brake. In this case, it is particularly recommended to use suitable friction materials within the friction clutch, e.g. ceramic materials, showing a constant friction value that is independent of temperature.

Another embodiment of the friction brake is obtained by that the friction clutch with an input-end portion is coupled to the rotation of the friction element by means of at least one gear stage. The gear stage serves for advantageously transmitting or multiplying the torque from the rotating friction element to the friction clutch. Said gear stage is in particular provided as toothed gear stage. Alternatively also other, among other things multi-stage gear unit types can be used. Altogether the rotational energy of the friction element is used directly as energy source for the friction brake by means of the gear stage, thus eliminating advantageously another high-performance energy source for the clamping device.

An advantageous development of the friction brake includes the coupling of an output-end portion of the friction clutch to the clamping device by means of at least one gear stage. The gear stage allows a multiplication or transmission of the torque into the clamping device. In addition, said gear stages allow an adapted design of the friction brake by means of a purposeful dimensioning and/or selection subject to the respective application. Such a gear stage is in particular provided as toothed-wheel gear stage or toothed-belt gear stage and allows a de-multiplication of the brake actuation force. Certainly in principle also other gear stages with analogue effect are possible. According to the application, also a multi-stage gear may be used.

In order to facilitate an exactly controllable brake actuation it is planned that the friction clutch with regard to its clutching effect is electrically controllable between the input-end portion and the output-end portion. Here the degree of the torque transmission between input-end and output-end portion is exactly adjustable by means of the frictional engagement of the clutch. This is achieved by means of a suitable actuation of the friction clutch, e.g. electrically, electromagnetically or by an electric motor. By actuating the friction clutch, the brake clamping force can be specifically defined within the friction clutch by means of the torque transmission. In order to improve the function, it is possible to design the friction clutch in an enclosed manner and to fill with suitable fluids, if necessary, so that there is also the possibility of wet running friction clutches. In addition to that there is the possibility to use-appropriate friction materials, as e.g. ceramic materials or similar.

The clamping device comprising a rotation-translation gear unit provides another advantageous variant of the friction brake. Above all, said rotation-translation gear unit leads to a conversion of the rotation delivered from the input end of the friction clutch into a translation movement, which in the end is transmitted to the brake lining. In an advantageous embodiment of the translation-rotation gear unit, the clamping device comprises a nut-spindle arrangement interacting with the output end of the friction clutch on the one hand and with the brake lining on the other. In this case, the rotation-translation gear is designed without the possibility of self-locking, so that the friction brake is able to open and release automatically after having finished the clamping. By eliminating the self-locking the rotation-translation gear unit automatically returns into the resting position.

A preferred compact variant of the friction brake results from that the clamping device and the friction clutch are arranged in a brake housing of the friction brake. Thus the single components of the friction brake are not only protected with regard to environmental influences, but allow also a space-saving overall construction. Furthermore the arrangement of the friction clutch within the brake housing facilitates the sealing against the environment of the friction brake. First of all easy-to-design seals can be used here.

A further development of the friction brake results from that the friction brake provides several clamping devices which are coupled each to the rotation of the friction element by means of a friction clutch and may each act upon at least one brake lining. This allows realising a generic fixed-type caliper disc brake being provided on each side of the brake disc with a clamping device and a friction clutch.

A further field of application for a friction brake according to the present invention is obtained by that the friction brake includes a friction element with several friction rings being arranged in axial distance to each other and upon which respective brake linings have a tribological effect. Thus also a disc brake with several friction rings can be provided with a generic clamping device as well as a friction clutch. In this case, a design with several clamping devices respectively friction clutches with at least one clamping device respectively friction clutch being arranged between two friction rings seems to be advantageous.

Further useful details of the present invention can be seen in the embodiments of the Figures and are described in detail in the following.

DETAILED DESCRIPTION OF PREFERRED EMBODIMENTS

Figure 1:
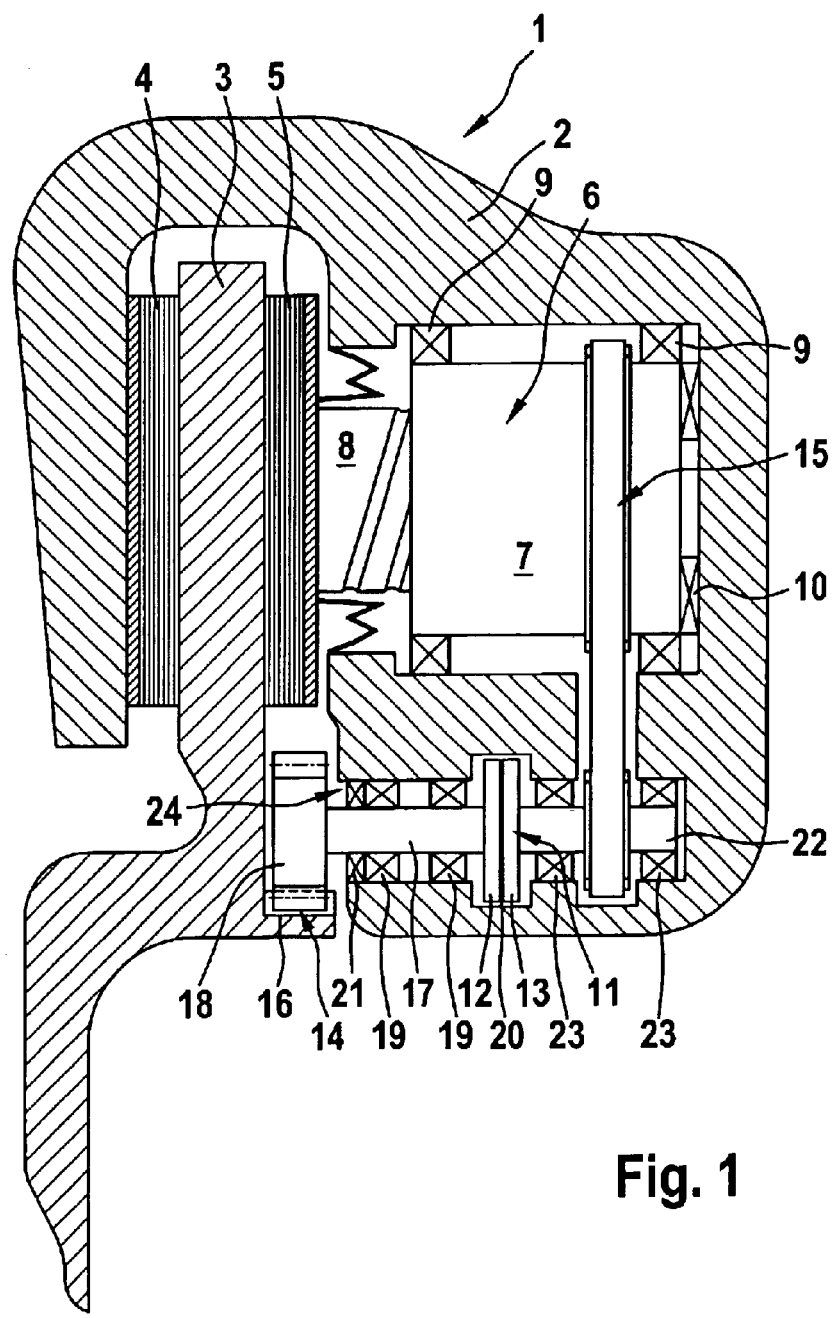
FIG. 1 a first friction brake designed as floating-caliper disc brake with a clamping device coupled to the rotation of the friction element, in a sectional view.

The Figures show several embodiments of a friction brake 1, 31, 41, 51 of a motor vehicle, designed as disc brake, which embraces with each brake housing 2, 32, 42, 52 one brake disc 3, 33, 43, 53 as well a brake linings 4,5 arranged on both sides of the brake disc 3, like a caliper. The disc brake 1 in FIG. 1 is designed as floating-caliper disc brake, the brake housing 2 of which being supported in a displaceable manner on a component mounted on the vehicle. The brake disc 3 is connected in an unrotatable manner with a vehicle wheel, which is not shown or coupled at least to the rotation of a vehicle wheel. Disc brake 1 is provided with one clamping device 6 acting at least upon one brake lining 5 in order to clamp the disc brake 1 during the actuation of the brake. The clamping device 6 on its part is coupled to the rotation of the brake disc 3 by means of a controllable friction clutch 11 inserted in between. For this reason, gear stages 14, 15 are provided between one input-end portion 12 of the friction clutch 11 and the brake disc 3 as well as between one output-end portion 13 of the friction clutch 11 and the clamping device 6 in order to transmit the torque. This allows using the rotational energy of the brake disc 3 for clamping the brake disc 1 when actuating the brake. An additional separate energy source for the clamping device 6 is thus no longer necessary.

In particular the first gear stage 14 between brake disc 3 and friction clutch 11 is preferably designed as simple toothed-wheel gear stage 14. It comprises an external toothing 16 on brake disc 3 meshing with a toothed gear 18 arranged on a first shaft 17. The first shaft 17 is supported in a rotatable manner in brake housing 2 by means of bearing 19 and connected at the same time in an unrotatable manner with the input end 12 of the friction clutch 11. In that way the rotational energy on brake disc 3 is taken up by means of toothed-wheel gear stage 14 and introduced into the friction clutch 11 when the revolutions are increased and the torque is reduced at the same time.

The friction clutch 11 is designed as a controllable friction clutch with an input-end portion 12 and an output-end portion 13 the frictional engagement of which can be controlled in order to transmit the torque in a defined manner. When the friction clutch 11 is in its resting position, i.e., when the disc brake 1 is not actuated, the input-end portion 12 and the output-end portion 13 are not in frictional engagement so that the torque cannot be transmitted. The defined dimensioning of the torque transmission is obtained by a suitable control of the frictional engagement between the input-end portion 12 and the output-end portion 13, preferably by means of an electrical or electromagnetic operation or by means of an electric motor respectively control of the friction clutch 11. In order to influence the friction clutch 11 furthermore in a positive way, the input-end portion 12 and the output-end portion 13 are provided with suitable friction material 20 on their friction surfaces. Ceramic materials are considered as suitable friction materials 20 because they present a constant frictional value being independent of temperature, on the one hand, and a high resistance to wear, on the other hand. Certainly also other materials with similar advantageous characteristics can be used. The friction clutch 11 as a whole is protected against environmental influences, as dirt and humidity and arranged within the brake housing 2. In particular, the friction clutch is encapsulated respectively sealed against the environment by means of a seal 21 acting between the first shaft 17 and the brake housing 2. Such a seal 21 can be designed in an advantageously simple manner because only one opening 24 in the housing is needed for arranging the friction clutch 11 in the brake housing 2 where the first shaft 17 extends out of the brake housing. Hence only one single sealing 21 is necessary in order to encapsulate the friction clutch 11 on the inside of the brake housing 2 against the environment. This offers the possibility to fill the friction clutch 11 respectively the inside of the brake housing 2 with a suitable fluid. In this way, the fluid used can have an additional influence on the friction effect within the friction clutch 11. Thus, according to the case of clamping, also the use of wet running friction clutches 11 is allowed.

The output-end element 13 of the friction clutch 11 is connected in an unrotatable manner with a second shaft 22 being in turn supported in the brake housing 2 in a rotatable manner by means of bearings 23, e.g. rolling bearings. This second shaft 22 serves for coupling the input end 13 to the clamping device 6 by means of a second gear stage 15. The second gear stage 15 is preferably designed as belt transmission or toothed belt transmission. Certainly also other gear unit types, in particular multi-stage gear unit types are possible.

The friction pairing 12, 13 of the friction clutch 11 is designed independently from the friction pairing 3-S of disc brake 1. In particular, the friction clutch 11 is spatially separated from friction pairing 3–5 of disc brake 1. Thus the friction clutch 11 is structurally decoupled with regard to the temperature and as also otherwise from friction pairing 35 of disc brake 1. This allows a design of the friction clutch 11 which can be flexibly adapted independently from the friction brake 1. This refers among other things to the selection of friction materials in the friction clutch 11. Ultimately the independent design of friction clutch 11 is achieved which allows, above all, the definition of an essentially constant friction value within the friction clutch 11 independent of temperature. This facilitates the exact control of the clamping force within the friction brake 1 by means of controlling the friction clutch 11.

Furthermore, the controllable friction clutch 11 leads to an indirect braking effect on brake disc 3 in addition to the definable application of a torque to the clamping device 6.

When the friction clutch 11 is closed, a possible reaction moment is transmitted to the brake disc 3 by means of the first shaft 17 as well as the gear stage 14. Therefore the closed friction clutch 11 leads to an indirect braking effect on brake disc 3 independently from the friction pairing 3–5 of the friction brake 1.

The clamping device 6 is preferably provided with a rotation-translation gear unit in order to convert the rotational movement introduced by the second gear stage 15 into a translation movement to be transmitted onto brake lining 5. For this reason, clamping device 6 includes a nut 7 supported in a rotatable manner in brake housing 2 by means of several bearings 9, 10, and a pertinent spindle 8 arranged in an unrotatable manner within the brake housing 2 and in a rotatable manner with regard to the nut 7. Hereby the rotational movement of nut 7 caused by the second gear stage 15 is converted into a translation movements of spindle 8, spindle 8 acting directly upon the brake lining 5.

When the brake is actuated, the torque taken up by the first gear stage 14 on brake disc 3 and transmitted to the input-end friction clutch element 12 is transferred to the output-end element 13 of friction clutch 11 by means of frictional engagement due to the control of the friction clutch 11. The second gear stage 15 causes the transmission of the torque to the clamping device 6 and thus ultimately to brake lining 5. Both gear stages 14, 15 as well as the clamping device 6 allow a flexibly adapted design of the friction brake with regard to the torque respectively clamping force transmission due to their respective configuration. In particular the gear stages 14, 15 may be configured with several stages. This means that the rotational energy of the brake disc 3 is essentially used in order to achieve the clamping force in the disc brake 1. Compared hereto, the control of the friction clutch 11 requires only a small amount of energy.

This results in a very compact configuration of the disc brake 1, because the clamping device 6 and the friction clutch 11 are arranged within the brake housing 2. Furthermore, friction clutch 11 is decoupled from the direct effect of brake disc 3 because the first gear stage 14 is inserted. Thus considerable temperature variations on the brake disc 3 do not have any effect on the torque transmission. Friction value variations and variations in the torque transmission within the friction clutch 11 resulting therefrom are thus reduced to a minimum.

The configuration of the friction brake according to the present invention is certainly not limited to the embodiment with a floating-caliper disc brake shown in FIG. 1. In principle such an arrangement could be used also with a drum brake or other disc brake configurations. Further advantageous embodiments of disc brakes according to the present invention can be seen in FIGS. 2–4.

A functional expansion of the friction brake can be achieved by adding another gear stage so that the friction brake guarantees the desired braking effect for both driving directions of the vehicle. In addition also parking brake functions can be realized by adding a simply configured locking device to the described embodiment.

Figure 2:
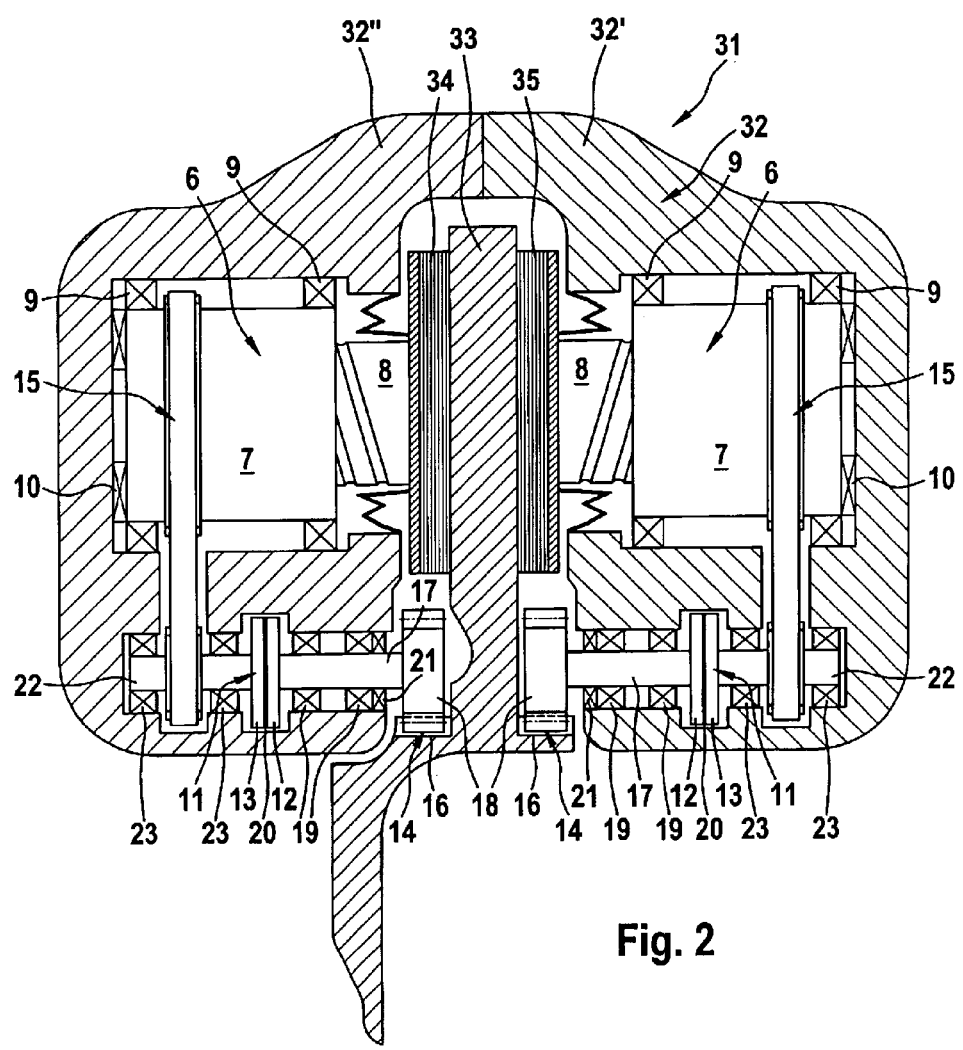
FIG. 2 a second friction brake designed as fixed-caliper disc brake with two generic clamping devices in a sectional view.

FIG. 2 shows an embodiment of the friction brake 31 according to the present invention with the friction brake being configured as fixed-caliper disc brake 31. The fixed-caliper disc brake 31 includes a brake housing 32 which is in principle mirror-symmetric to the brake disc level and embraces the brake disc 33 as well brake linings 34, 35 arranged on both sides of the brake disc 33 like a caliper. In particular the fixed-caliper housing 32 may include two essentially identical housing halves 32', 32". The fixed-caliper housing 32 is mounted on the vehicle and the brake disc 33 is arranged in a rotatable manner with regard to the fixed-caliper housing 32. On each side of the brake disc 33 a clamping device is provided which interacts with the pertinent brake lining 34, 35 in the manner described above. The clamping device 6 is in operative engagement with the controllable friction clutch 11 by means of a gear stage 15, similar to the configuration of the friction brake according to FIG. 1. Each of the friction clutches 11 on both sides of the brake disc 33 is coupled to the rotation of the brake disc 33 with its input-end portion 12 by means of another gear stage 14. Thus the working principle of the present invention described for the embodiment in FIG. 1, is applicable also to fixed-caliper brakes 31 with two clamping devices 6 and two pertinent friction clutches 11. The controllable friction clutches 11 are, according to the present invention, configured-independently from the friction pairing 33–35 of friction brake 31. Apart from that the principle characteristics of the invention, already described on the basis of the floating-caliper disc brake according to FIG. 1, are maintained also for the fixed-caliper brake 31 according to FIG. 2.

Figure 3:
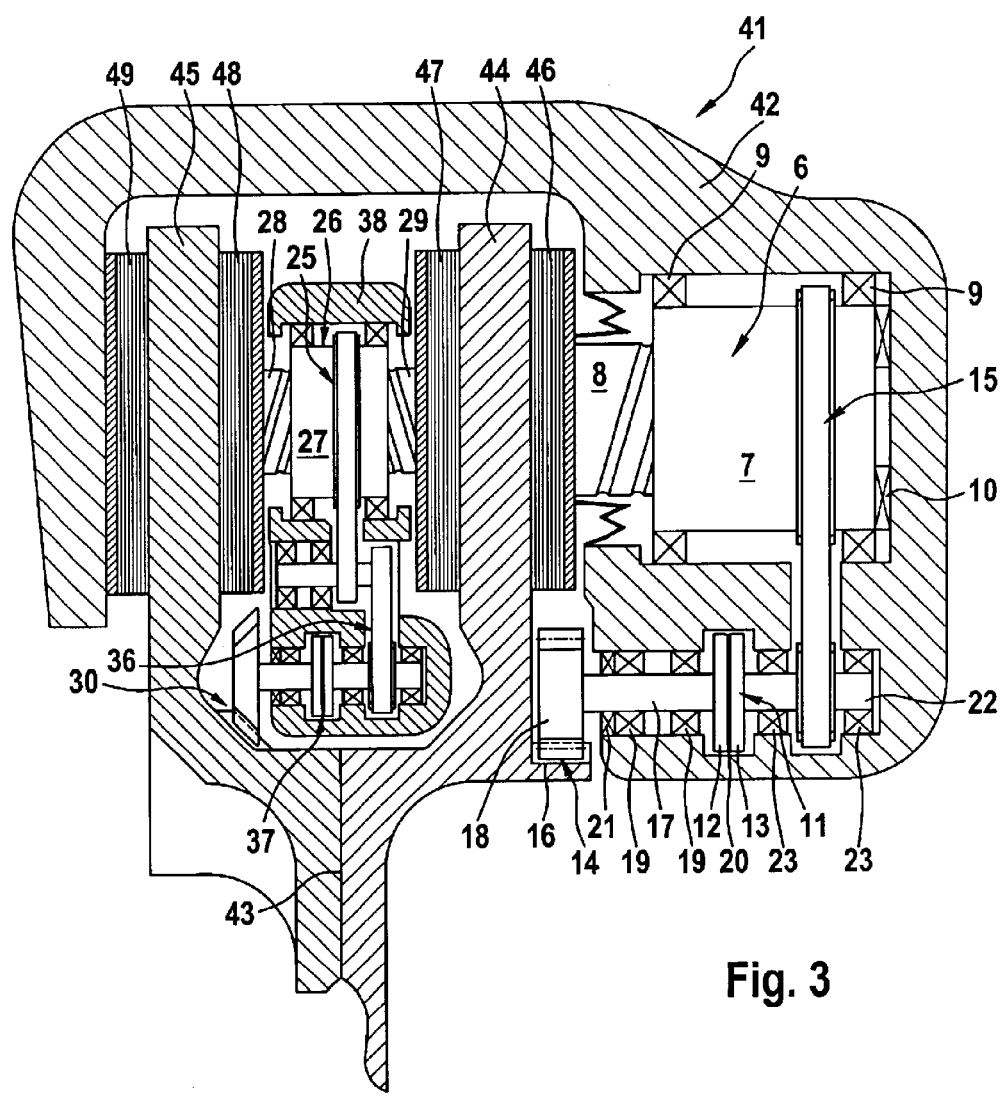
FIG. 3 a third variant of a disc brake according to the present invention with two friction rings and two generic clamping devices in a sectional view and FIG. 4 a fourth variant of a floating-caliper disc brake according to the present invention in a sectional view.

On the other hand, FIG. 3 shows a further developed embodiment of a disc brake 41 with a friction element 43, including two friction rings 44, 45. Each of the friction rings 44, 45 interacts with pertinent brake linings 46–49. A brake housing 42 embraces the friction rings 44, 45 as well as the brake linings 46–49 like a caliper and is arranged in an axially displaceable manner as a floating caliper on a component that is mounted on the vehicle, e.g. a brake support element. The two friction rings 44, 45 are rigidly connected with each other at a certain axial distance. The pertinent brake linings 46–49, however, are arranged in an axially displaceable manner within the brake housing 42, the brake linings 46–49 being mounted on the vehicle in circumferential direction in order to transmit brake circumferential forces, e.g. on the brake housing 42 or a brake support element (not shown). Two clamping devices 6, 26 are provided for actuating the brake and coupled to the rotation of the friction element 43 with the two friction rings 44, 45 by means of inserted gear stages 14, 15, 25, 30, 36 as well as controllable friction clutches 11, 37. The first clamping device 6 together with the pertinent friction clutch 11 as well as the gear stages 14, 15 corresponds in principle to the embodiments according to FIGS. 1 and 2. In this case the first clamping device 6 interacts with a brake lining 46 provided in axial direction on the inside. A second clamping device 26 is provided between the rigid friction rings 44, 45 within the housing 38 which interacts on both sides with pertinent brake linings 47, 48 in order to press them against the respective friction ring 44, 45 when the brake is actuated. In this case the housing 38 for the second clamping device 26 is arranged in an axially displaceable manner with regard to brake housing 42. The second clamping device 26 is also configured as rotation-translation gear unit and includes a nut 27 supported in a rotatable manner within housing 38 with two pertinent spindles 28, 29 each interacting with the brake linings 47, 48. The spindles 28, 29 are each supported in a rotatable manner and without the possibility of self-locking within the nut 27 and in an unrotatable manner with regard to the housing 38. The spindles 28, 29 include threads with opposite pitches. Correspondingly, thread sections with opposite pitch are formed in the nut 27. Turning the nut 27 within the housing 38 thus leads to a translation movement of the two spindles 28, 29 in the opposite direction. This allows pressing the brake linings 47, 48 to the friction rings 44, 45 when the friction brake 41 is clamped, i.e. rotation of the nut 27 in one direction, and consequently to retract the brake linings 47, 48 from the friction rings 44, 45 when the friction brake 41 is released, i.e. rotation of the nut 27 in the opposite direction. Because the nut-spindle-arrangement 28–29 has no possibility of self-locking, the brake is released automatically.

The second clamping device 26 is coupled to the rotation of the friction element 43 by means of gear stages 25, 36, 30, already described in their substantial function, as well as a friction clutch 37, so that it can be driven. The second clamping device 26, the gear stages 25, 36 as well as the friction clutch 37 are arranged in an advantageously compact manner within the housing 38. In particular the gear stages 25, 36 are configured as toothed gear stages or toothed belt gear stages and may be configured according to the application. In particular the gear stages 25, 36 provide for a multiplication of the torque to the second clamping device 26 on the basis of the friction clutch 37. On its input end the friction clutch 37 is coupled to the rotation of the friction element 43 by means of another gear stage 30 being configured e.g. as bevel-wheel gear stage. The friction clutch 37 can be controlled in the described manner with regard to the clutching effect in order to control the brake clamping force.

The working principle according to the present invention can be transferred to a variant of the friction brake according to FIG. 3 with two friction rings by the housing 38 with the second clamping device 26 and the second friction clutch 37.

Figure 4:
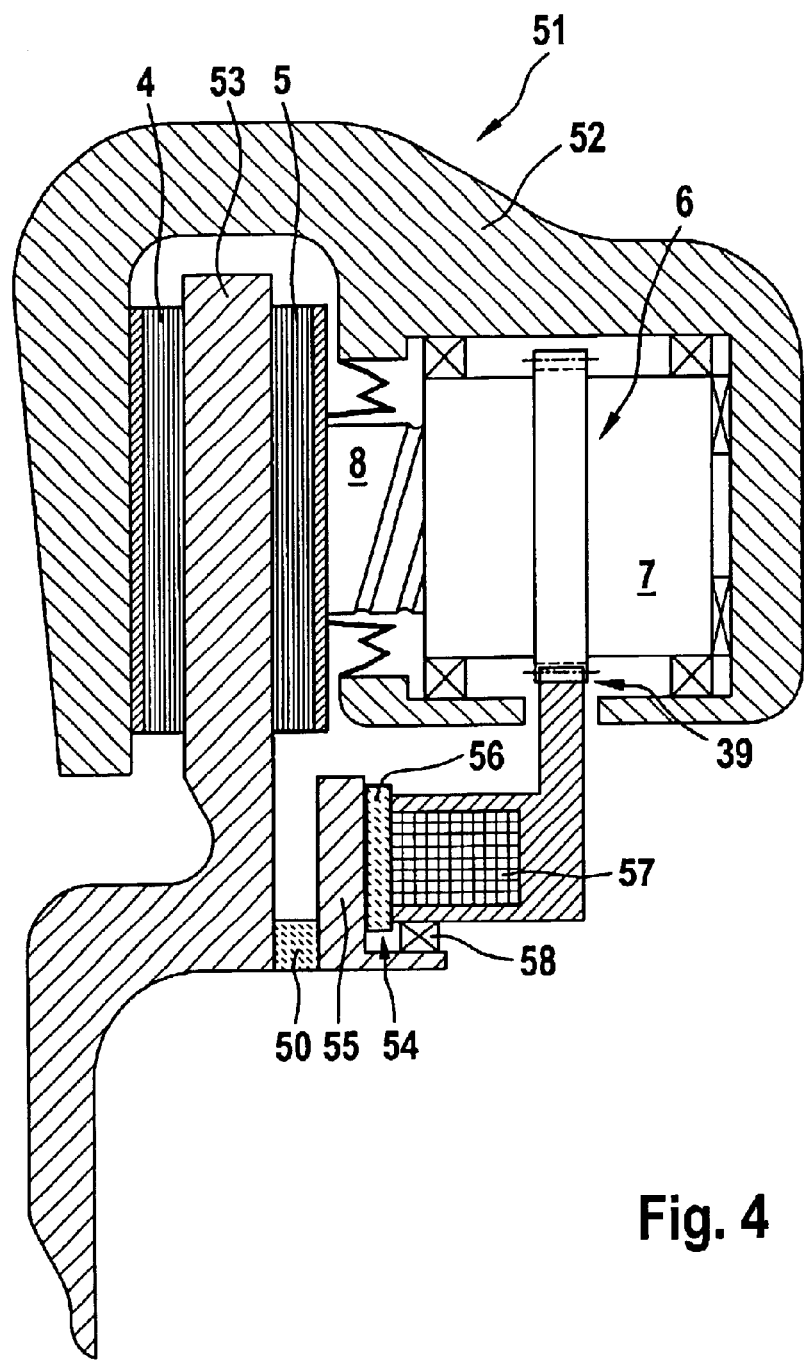

FIG. 4 shows another variant of a friction brake 51 being configured as a floating-caliper disc brake 51 in a comparable manner to the embodiment according to FIG. 1. Similar to FIG. 1 the floating-caliper disc brake 51 includes a brake housing 52, arranged in a displaceable manner, with an clamping device 6 acting upon a brake lining 5 by means of a nut-spindle arrangement 7, 8. The other brake lining 4 is pressed indirectly against the respective brake disc 53 when the floating-caliper disc brake 51 is clamped by axially displacing the brake housing 52. Thus, the brake disc 53 and the two brake linings 4, 5 correspondingly arrange for the friction pairing of the friction brake 51. The clamping device 6 is driven, as described before, by the torque of the rotating brake disc 53, the torque being transmitted or converted by means of a controllable friction clutch 54 and a gear stage 39. The friction clutch 54 includes an input-end element 55 being connected in an unrotatable manner with brake disc 53, and an output-end element 56 coupled to the clamping device 6 by means of gear stage 39. The input-end element 55 is formed by a friction element 55 being connected in an unrotatable manner with the brake disc 53 maintaining an axial distance. Thus the friction pairing 55, 56 of friction clutch 54 is spatially separated from friction pairing 4, 5, 53 of friction brake 51. The friction clutch 54 is increasingly independent of the influences of friction brake 51 by arranging an isolation layer 50 made of suitable material between brake disc 52 and the input-drive end 55 of friction clutch

54. The isolation layer serves in principle for thermally decoupling the friction clutch 54 from brake disc 53. Suitable materials for this isolation layer 50 are e.g. ceramic materials. Due to the thermal and spatial decoupling of the input-end element 55 of the friction clutch 54 from brake disc 53, the friction-clutch 54 is not affected by thermal or other negative influences of friction brake 51. The output-end element 56 of friction clutch 54 is configured as further friction element made of suitable material, e.g. with ceramic material portions, and connected with a controllable actuation unit 57. The actuation unit 57 is electrically operable and supported in a rotatable manner with regard to the input-end element 55 of friction clutch 54 by means of a bearing 58. The actuation unit 57 of friction clutch 54 is provided e.g. as electrical lifting magnet.

The friction clutch 54 is open in its resting position so that the input-end element 55 and the output-end element 56 are not in frictional engagement. If the brake is actuated, the actuation unit 57 is operated by electrical signals in an exactly definable manner in order to adjust an exactly controllable frictional engagement in the friction clutch 54 by axial displacement of the output-end element 56. The frictional effect within friction clutch 54 and thus the dimension of the torque taken up by the friction clutch 54 on the rotating brake disc 54 can be exactly defined. Thus ultimately also the driving energy for the clamping device 6 is exactly defined. Altogether the clamping force in the friction brake 51 can be controlled as desired by controlling the friction clutch 54. Such a friction brake 51 is thus suited for being used in modern, controllable brake systems.

The friction brakes 1, 31, 41, 51 described in FIGS. 1–4 have in common that each friction pairing of friction brake 1, 31, 41, 51 is independent of the friction pairing of the controllable friction clutch 11, 37, 54. Thus, the friction clutch 11, 37, 54 is substantially decoupled from friction brake 1, 31, 41, 51. The friction clutch 11, 37, 54 can thus be adapted exactly independently from the other components of the friction brake 1, 31, 41, 51. This refers e.g. to the structural configuration and the selection of suitable friction materials within the friction coupling in order to adjust a possibly constant friction value independently of the operative conditions of the friction brake 1, 31, 41, 51. In this case, the friction value in friction clutch 11, 37, 54 should, above all, be independent of temperature, in order to exclude undesired fading effects within the controllable friction clutch. For this reason, the friction clutch 11, 37, 54 is thermally decoupled from the brake disc 3, 33, 43, 53 which is subject to a high temperature. Decoupling the friction clutch 11, 37, 54 from the friction pairing of friction brake 1, 31, 41, 51 allows to control the brake clamping force by means of the controllable friction clutch 11, 37, 54 on an exactly definable manner.

What is claimed is:

1. Friction brake, for a motor vehicle, with at least one friction element coupled to the rotation of a vehicle wheel forming a friction pairing of the friction brake with at least one associated brake lining, with at least one clamping device for pressing at least one brake lining against the friction element, with at least one controllable friction clutch being coupled with the input end to the rotation of the friction element and with the output end to the clamping device, wherein a friction pairing of the friction clutch is provided independently of the friction pairing of the friction brake, and wherein the clamping device includes a rotation-translation gear unit and a nut-spindle arrangement.

2. Friction brake according to claim 1, wherein the friction pairing of the friction clutch is thermally decoupled from the friction pairing of the friction brake.

3. Friction brake according to claim 2, wherein the friction pairing of friction clutch has a distance from the friction pairing of friction brake and is thermally isolated with regard to the latter.

4. Friction brake according to claim 1, wherein the friction pairing of the friction clutch includes a different combination of friction materials than the friction pairing of the friction brake.

5. Friction brake according to claim 1, wherein the friction clutch with one input-end element is coupled to the rotation of the friction element by means of at least one gear stage.

6. Friction brake according to claim 1, wherein the friction clutch is coupled to the clamping device with one output-end element by means of at least one gear stage.

7. Friction brake according to claim 1, wherein the friction clutch is electrically controllable with regard to its clutching effect.

8. Friction brake according to claim 1, wherein the clamping device and the friction clutch are arranged in a brake housing of friction brake.

9. Friction brake according to claim 1, wherein the friction brake is provided with a friction element with several friction rings arranged at an axial distance to each other, upon which pertinent brake linings are acting in a tribological manner.

10. Friction brake, for a motor vehicle, with at least one friction element coupled to the rotation of a vehicle wheel forming a friction pairing of the friction brake with at least one associated brake lining, with at least one clamping device for pressing at least one brake lining against the friction element, with at least one controllable friction clutch being coupled with the input end to the rotation of the friction element and with the output end to the clamping device, wherein a friction pairing of the friction clutch is provided independently of the friction pairing of the friction brake, and wherein the friction brake includes several clamping devices, each being coupled to the rotation of the friction element by means of a friction clutch.

11. Friction brake according to claim 10, wherein the clamping device includes a rotation-translation gear unit.

12. Friction brake according to claim 10, wherein the friction pairing of the friction clutch is thermally decoupled from the friction pairing of the friction brake.

13. Friction brake according to claim 12, wherein the friction pairing of friction clutch has a distance from the friction pairing of friction brake and is thermally isolated with regard to the latter.

14. Friction brake according to claim 10, wherein the friction pairing of the friction clutch includes a different combination of friction materials than the friction pairing of the friction brake.

15. Friction brake according to claim 10, wherein the friction clutch with one input-end element is coupled to the rotation of the friction element by means of at least one gear stage.

16. Friction brake according to claim 10, wherein the friction clutch is coupled to the clamping device with one output-end element by means of at least one gear stage.

17. Friction brake according to claim 10, wherein the friction clutch is electrically controllable with regard to its clutching effect.

18. Friction brake according to claim 10, wherein the clamping device and the friction clutch are arranged in a brake housing of friction brake.

19. Friction brake according to claim 10, wherein the friction brake is provided with a friction element with several friction rings arranged at an axial distance to each other, upon which pertinent brake linings are acting in a tribological manner.

* * * * *